United States Patent [19]
Harde

[11] Patent Number: 5,305,903
[45] Date of Patent: Apr. 26, 1994

[54] DEVICE IN FUEL TANKS

[75] Inventor: Bo Harde, Wieselgreusgata, Sweden

[73] Assignee: AB Volvo, Gothenborg, Sweden

[21] Appl. No.: 890,587

[22] PCT Filed: Jan. 8, 1991

[86] PCT No.: PCT/SE91/00011
 § 371 Date: Jul. 6, 1992
 § 102(e) Date: Jul. 6, 1992

[87] PCT Pub. No.: WO91/11342
 PCT Pub. Date: Aug. 8, 1991

[30] Foreign Application Priority Data

Jan. 26, 1990 [SE] Sweden ................. 90000277

[51] Int. Cl.⁵ ............................................. B65D 25/20
[52] U.S. Cl. ................................. 220/86.2; 141/312;
 138/172; 277/178; 285/337; 285/338; 285/224;
 285/235; 285/910
[58] Field of Search .............. 220/86.2, 319, 320;
 285/337, 910, 338, 162, 224, 235; 16/2;
 277/178; 138/172; 141/312

[56] References Cited
U.S. PATENT DOCUMENTS

| 610,262 | 9/1898 | Dikeman | 138/172 |
| 3,233,907 | 2/1966 | Stanton | 277/178 |
| 4,088,241 | 5/1978 | Hall et al. | 220/86.2 |
| 4,323,166 | 4/1982 | Maeroff | 220/86.2 |

Primary Examiner—Allan N. Shoap
Assistant Examiner—Stephen Cronin
Attorney, Agent, or Firm—Harness, Dickey & Pierce

[57] ABSTRACT

The invention concerns a device in fuel tanks, preferably for vehicles, said tanks being provided with a mouth socket to which a filler tube is connected so as to have its one end portion projecting into the tank. Between the mouth socket and the filler tube a seal is provided, the latter being formed with a portion grippingly enclosing the mouth edge of the socket and defining, together with the filler tube, an intermediate space allowing oscillation of the filler tube relatively to the socket. A washer is pressed against the filler tube and is formed with a bent-over portion grippingly engaging said portion of the seal. A reinforcement sleeve is positioned inside the filler tube and presses against the inner face of the filler tube. A clamp-joint sleeve is fitted around the mouth socket, enclosing portion of the seal and the washer.

10 Claims, 1 Drawing Sheet

DEVICE IN FUEL TANKS

BACKGROUND OF THE INVENTION

The invention concerns a device in fuel tanks, preferably for vehicles, the tank being provided with a mouth socket to which a filler tube is connected.

Previously, fuel tanks for vehicles within the car industry were made from deep-drawn, lead-covered sheet metal. In accordance with prior-art technology, an upper and a lower section are welded together and the tank thus formed is provided with a socket to which a filler tube is in turn connected. In order to prevent leakages from arising at the socket mouth, as may be caused by vibrations when the vehicle is running, a rubber hose is inserted between the socket and the filler tube and attached to said components with the aid of hose clamps. In particularly exposed positions reinforced rubber hoses are usually used.

In later years, synthetic resin tanks have come into use as they are now capable of satisfying the strength and security requirements on fuel tanks. However, the technology used in the manufacture of sheet metal tanks as concerns the interconnection between the socket and the filler tube has been adopted also for synthetic resin tanks. Thus, the socket, now manufactured from blow-moulded synthetic resin, is connected to the filler tube by means of a rubber hose and hose clamps. The joint between the tank and the filler tube is, however, a weak link. The rubber hose ages more rapidly than the rest of the components, particularly when used in positions where, during vehicle running it is exposed to sprays of water mixed with sand and salt from the roadway. This increases largely the risks for leakages caused by cracks in the tube, and also increases the risks for rupture of the tube, which could easily occur in the event of a collision. Obviously, fuel leakages constitute serious fire hazards.

SUMMARY OF THE INVENTION

The invention provides a device designed for direct connection of a rigid filler tube to a filler tank without the need of a hose. The device allows rotational and to some extent oscillating movements of the filler tube relatively to the fuel tank and even distortion of the fuel tank without any risk of leakage. The caracterizing features of this device appears from the appended claims.

BRIEF DESCRIPTION OF THE DRAWINGS

The invention will be described in closer detail in the following with reference to the accompanying drawing, wherein.

DETAILED DESCRIPTION OF THE PREFERRED EMBODIMENT OF THE INVENTION

Figure 1:
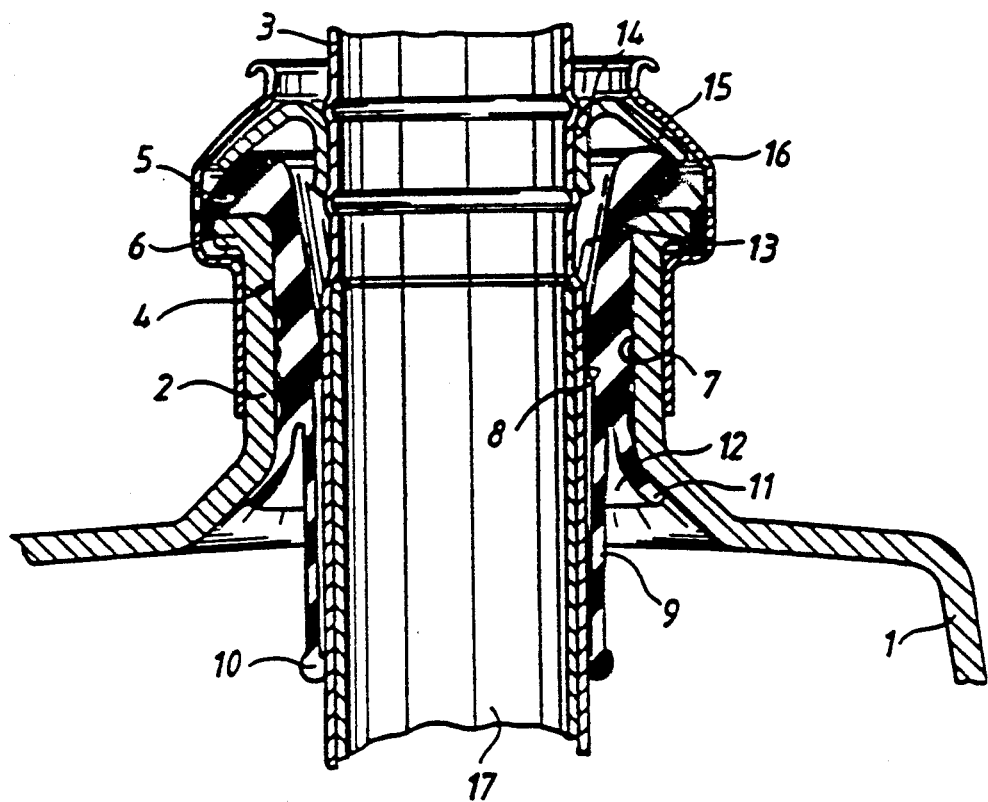
FIG. 1 is a longitudinal sectional view through the connection area between a fuel tank and a filler tube.

On the drawing only a small part of the fuel tank 1 is illustrated, the filler opening of which merges into a mouth socket 2. A filler tube 3 extends through the mouth socket 2 and projects somewhat into the tank 1.

Figure 2:
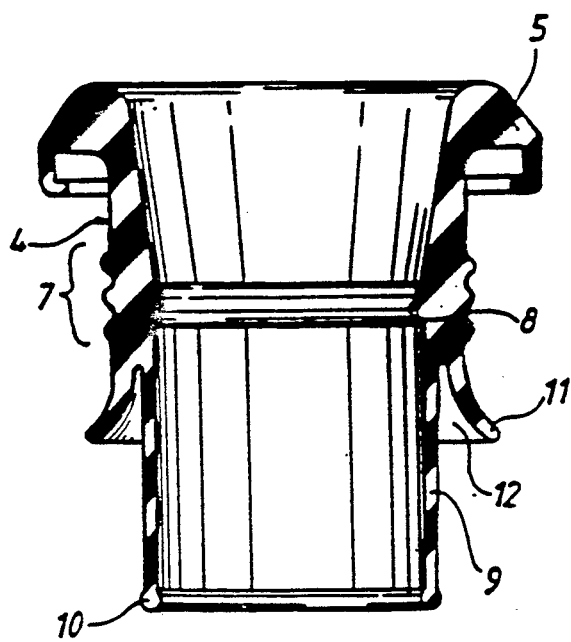
FIG. 2 is a longitudinal section through a seal incorporated into the device.

In accordance with the invention a seal 4, having the particular configuration appearing from FIG. 2, is inserted between the mouth socket 2 and the filler tube 3. A first portion 5 of the seal 4 grippingly encloses the mouth edge 6 of the socket 2 while a second portion 7 and a third portion 8 of the seal are pressed against the socket 2 and the filler tube 3, respectively, in a manner similar to that of 0-rings. By means of a fourth portion 9 the seal 4 together with the filler tube 3 projects into the interior of the tank 1 and the inner marginal end portion 10 of the seal likewise presses against the filler tube 3 in the manner of an 0-ring. The seal 4 is also formed with a lip portion 11 which abuts the inner face of the mouth socket 2 in the area of the junction of said socket with the tank 1. Together with the seal portion 9 the lip 11 forms a pocket 12.

In the area of the gripping portion 5 the seal 4 is configured so as to define a space 13 towards the filler tube 3. In accordance with the invention, a washer 14 is forced onto the filler tube 3 so as to press against the latter and an outer, bent-over portion 15 of the washer 14 bridges said space 13 and grippingly engages the portion 5 of the seal 4. A clamp-joint sleeve 16 is provided around the mouth socket 2 so as to enclose portion 5 of the seal 4 and the washer 14. In its function as an interconnecting member the clamp-joint sleeve 16 serves as security device in the event of collisions.

Owing to the design of the seal 4 as described above and the position of the seal in the mouth of the tank 1 the tank 1 is well sealed while at the same time some movement of the filler tube 3 is allowed in an arbitrary direction in relation to the mouth socket 2 without any risks of leakage. When the filler tube 3 swings arbitrarily to the left or to the right as seen in the drawing figure the space 13 will be reduced or increased accordingly on one side or the other as the case may be while at the same time the washer 14 will enclose portion 5 of the seal 4 to a larger or smaller extent. The marginal end portion 10 of the seal 4 will at all times adhere to the inner end portion of the filler tube 3 and sealingly abut against the latter.

Owing to the particular design of the seal 4 the filler tube may be manufactured from a rigid material, such as aluminium, which is better suited than a rubber hose to withstand the effects of exposure to the severe conditions prevailing in a vehicle. In accordance with the invention, the inner end portion of the filler tube 3 is also provided with a reinforcement sleeve 17 made from a harder material than the filler tube 3. The sleeve 17 permits a certain maximum movement of the filler tube 3 without the latter being distorted, which otherwise could have caused leakages.

In case the tank 1 is distorted, for instance in the event of a collision, resulting in generation of a positive pressure is created inside the tank, said positive pressure will force the lip 11 of the seal to be pressed against the inner faces of the socket 2 or the tank 1 while at the same time the portion 9 and the edge portion 10 of the seal will be pressed against the filler tube 3. Positive pressure inside the pocket 12 thus will provide an improved sealing function.

The invention is not limited to the embodiment as illustrated and described but could be varied in many ways within the scope of the appended claims. It goes without saying that the seal 4 could be used in various kinds of tanks in other connections than in fuel tanks for vehicles.

I claim:

1. A sealing arrangement comprising a liquid tank having an outer body defining a cavity for containing a fluid and a mouth socket having a tubular portion defining an opening into said cavity, a filler tube extending through said mouth socket tubular portion with a substantial clearance therebetween, and a seal engaging and sealingly said tubular portion and said filler tube and accommodating substantial pivotal movement of said filler tube relative to said tubular portion while maintaining the seal therebetween, said seal having a first portion resiliently engaged with the outer end of said tubular portion for effecting a seal therewith and for retaining said seal to said liquid tank, a second portion spaced along the axis of said filler tube and sealingly engaged with said filler tube for retaining said filler tube relative to said seal, the area of said seal between said second portion and said first portion defining a clearance between said seal and said filler tube for accommodating pivotal movement of said filler tube about said second portion relative to said first seal portion, and a third portion spaced from said second portion and sealingly engaged with one of said filler tube and said mouth socket adjacent said cavity.

2. A sealing arrangement as claimed in claim 1 wherein the tubular portion has an outer end and is provided with a flange at the outer end with which the first portion of the seal is resiliently engaged.

3. A sealing arrangement as claimed in claim 2 further including a clamping ring engaged with said first portion of said seal and with the mouth socket for retaining said seal relative to the fuel tank.

4. A sealing arrangement as claimed in claim 3 further including a washer having a first portion sealingly engaged with said filler tube in an area approximate to said clearance between said seal and said filler tube and a second portion sealingly engaged with said seal first portion and adapted to maintain its sealing relationship with said seal first portion upon pivotal movement of said filler tube.

5. A sealing arrangement as claimed in claim 4 wherein the third seal portion has at least a part sealingly engaged with said filler tube within said cavity and flexibly connected to said second seal portion for accommodating pivotal movement of said mouth socket.

6. A sealing arrangement as claimed in claim 5 wherein the third seal portion further has a flange part sealingly engaged with the inner periphery of the mouth socket with said first and said second portions defining an area adapted to receive liquid under pressure on deformation of the liquid tank to maintain the sealing engagement between said portions and the filler tube and mouth socket, respectively.

7. A sealing arrangement as claimed in claim 1 wherein the third seal portion has at least a part sealingly engaged with said filler tube within said cavity and flexibly connected to said second seal portion for accommodating pivotal movement of said mouth socket.

8. A sealing arrangement as claimed in claim 7 wherein the third seal portion further has a flange part sealingly engaged with the inner periphery of the mouth socket with said first and said second portions defining an area adapted to receive liquid under pressure on deformation of the liquid tank to maintain the sealing engagement between said portions and the filler tube and mouth socket, respectively.

9. A sealing arrangement as claimed in claim 1 further including a clamping ring engaged with said first portion of said seal and with the mouth socket for retaining said seal relative to the fuel tank.

10. A sealing arrangement as claimed in claim 9 further including a washer having a first portion sealingly engaged with said filler tube in an area approximate to said clearance between said seal and said filler tube and a second portion sealingly engaged with said seal first portion and adapted to maintain its sealing relationship with said seal first portion upon pivotal movement of said filler tube.

* * * * *